Jan. 5, 1965   R. M. CRAYFORD   3,164,825
SIGNAL CONVERTER SYSTEMS
Filed Oct. 3, 1960   3 Sheets-Sheet 1

Robert M. Crayford
INVENTOR.

BY
ATTORNEY

Robert M. Crayford
INVENTOR.

ATTORNEY

Jan. 5, 1965   R. M. CRAYFORD   3,164,825
SIGNAL CONVERTER SYSTEMS
Filed Oct. 3, 1960   3 Sheets-Sheet 3
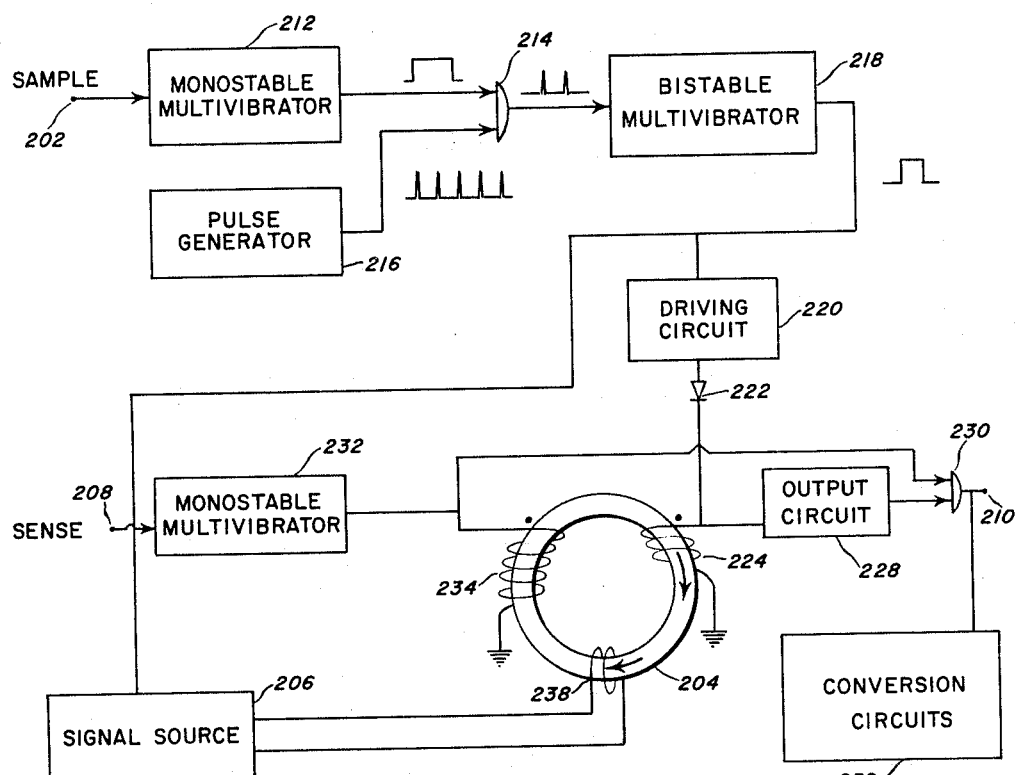
_Fig. 4._
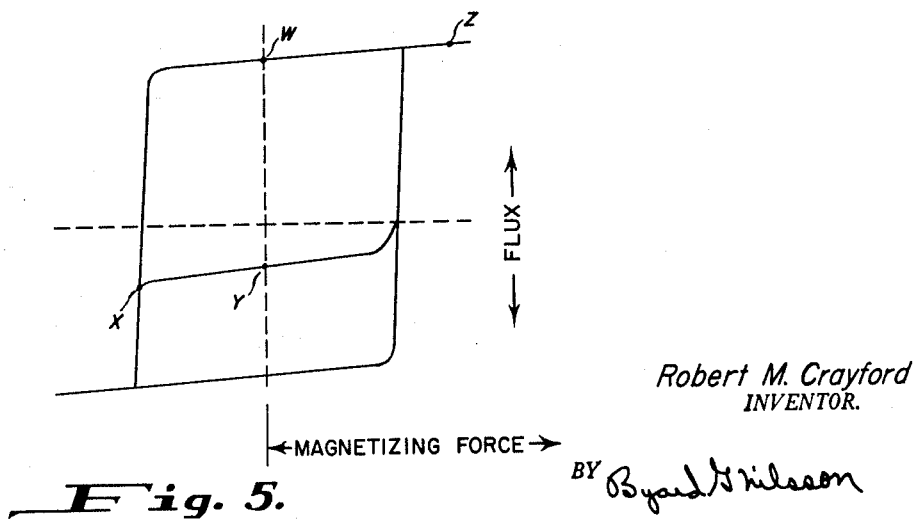
_Fig. 5._
Robert M. Crayford
INVENTOR.
BY Byard G. Nilsson
ATTORNEY 3,164,825
Patented Jan. 5, 1965

1

3,164,825
SIGNAL CONVERTER SYSTEMS
Robert M. Crayford, Venice, Calif., assignor to Electro-Logic Corporation, Venice, Calif., a corporation of California
Filed Oct. 3, 1960, Ser. No. 60,195
11 Claims. (Cl. 340—347)

The present invention relates to a signal converter for converting analog signals into pulses having a duration indicative of the amplitude of a received analog signal, in which pulses may be connected to a digital presentation of the analog value.

Many different types of transducers are employed in automated systems to sense various physical phenomena and manifest information in the form of an electrical signal. Often the signal manifesting the phenomena is in analog form, that is, the signal is amplitude-modulated to represent the degree or intensity of the observed phenoma.

Analog signals may be variously manipulated and combined to perform arithmetic, logic and control operations; however, in general, apparatus employing analog signals must be very precisely constructed to obtain acceptable accuracy. Therefore, it is somewhat common practice to convert analog signals (from transducers) into digital signals which may be accurately manipulated and combined. In general, analog-to-digital converters have taken the form of complex and expensive apparatus. Furthermore, additional expensive apparatus is often required to amplify and preserve analog signals prior to conversion to digital form.

The difficulty in preserving and handling analog signals results because these signals are amplitude modulated. That is, of the various aspects of an electrical signal, the amplitude is one of the most difficult to reproduce and preserve. An aspect of an electrical signal which can be precisely controlled and reproduced is pulse duration. Therefore, information or data represented by the duration of a pulse can be easily preserved and transmitted. This manner of representing information is termed "pulse-width modulation."

In general, the present invention comprises an apparatus for accurately converting an analog signal into a pulse-width modulated signal. To accomplish this conversion, a magnetic member is employed which has a magnetic saturation level and considerable magnetic retentivity. Magnetizing means are then provided to establish the magnetic member at the saturation level which becomes a reference level of magnetism. The magnetizing means then vary the magnetism of the magnetic element away from the saturation level during a precise time interval in accordance with the amplitude of the analog signal so as to register the analog signal. The magnetism of the magnetic element is then returned to the saturation level and means are provided for sensing the interval required to accomplish this change. This interval is then representative of the analog signal and may be conveniently transmitted and accurately preserved. Furthermore, the simple structure of a oscillator in conjunction with a counter and a gating arrangement may be employed to convert the pulse-duration signal into either a number of pulses representative of the analog signal, or a true digital presentation of the analog value. The invention also contemplates a component in the converter system which introduces a predetermined non-linearity in the scale of conversion to compensate inherent non-linearity of the system.

An object of the present invention is to provide an improved apparatus for converting electrical signals from one form to another.

2

Another object of the present invention is to provide an electrical signal converter, which may be simply and inexpensively constructed to accurately change the form of electrical signals.

Still another object of the present invention is to provide an improved signal converter employing the characteristics of a magnetic element to translate analog signals into pulse-duration signals by the technique of registering the analog signal in a magnetic medium.

A further object of the present invention is to provide a simple and inexpensive signal converter to reliably form pulse-duration signals that may be conveniently registered, transmitted and reproduced.

Still a further object of the present invention is to provide a converter system which functions reliably and may compensate for non-linearities as in associated equipment.

One further object of the present invention is to provide an apparatus for operation in conjunction with an analog-signal device to provide any of a variety of signals which may be accurately employed.

Another further object of the present invention is to provide an economical conversion apparatus which is capable of registering signals undergoing conversion, until the signals are desired in the converted form.

These and other objects of the present invention will become apparent from a consideration of the following, taken in conjunction with the referenced drawings, wherein:

FIGURE 4 is a diagrammatic representation of still another embodiment of the present invention; and FIGURE 5 is a graphical representation of the hysteresis characteristic for another magnetic material which may be employed in an embodiment of the present invention.

The present invention employs an element of magnetic material to accomplish the desired conversion. Customarily, magnetic materials are defined by the hysteresis loop, which is a plot of flux density along the vertical axis and magnetizing force along the horizontal axis. An exemplary hysteresis loop is shown in FIGURE 1 and will be considered preliminary to the description of examplary embodiments of the present invention.

Figure 1:
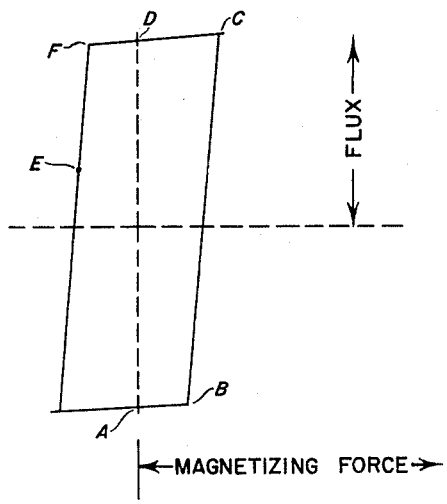
FIGURE 1 is a graphical presentation of the hysteresis characteristic of a magnetic material which may be employed in one form of the present invention.

The hysteresis loop of FIGURE 1 has a substantially-rectangular form. That is, if a strong magnetizing force is applied to the material described by the loop of FIGURE 1, the material saturates and very little change in flux is accomplished by further increases in the magnetizing force. Furthermore, upon removal of the magnetizing force, the flux or magnetization of the material changes by a very small amount as the magnetizing force drops to zero.

Considering the hysteresis loop of FIGURE 1 further, it is also to be noted that the transition from one level of saturation to another occurs at a threshold level of magnetizing force. Therefore, to alter the flux or magnetism of a magnetic material (defined by the loop of FIGURE 1) it is necessary to apply a magnetizing force adequate to magnetically drive the material beyond the threshold (knee of the curve) for a sufficient time to permit the core to change from one state to the other. It is to be noted, that the interval required for this change varies inversely as the intensity of the magnetizing force.

Assuming that a magnetic element under consideration is residually magnetized at level A (negative saturation) and that a magnetizing force is applied which is greater than that indicated by the knee B, the magnetism of the element will start to reverse toward the state indicated at the level C (positive saturation). However, the rate at which the magnetism changes from the negative saturation level A to the positive saturation level C is dependent upon the strength of the magnetizing force.

The magnetizing force represents electrical power and the consumption of power over the interval required to change a magnetic element from one saturation level to another is indicated by the product of power and time, or energy. These considerations lead to the well known fact that a magnetic element (as described by the hysteresis loop of FIGURE 1) requires a precise amount of energy to undergo the transformation from one saturation level to the other saturation level. In this regard, the direction of change is somewhat immaterial so that substantially the same energy is required in altering the magnetism of a given element from either saturation level to the other.

Assuming a change in the magnetism of an element from the positive saturation level to the negative saturation level requires power $P_1$ for time $T_1$ and the change from the negative saturation level to the positive saturation level requires energy of power $P_2$ for a time interval of time $T_2$, the above-described equality may be mathematically expressed as an energy equation:

$$P_1T_1 = P_2T_2$$

These considerations apply not only to a complete transition from one saturation level to the other, but also to partial transitions. For example, assume a magnetic element is residually magnetized at the level D as indicated in FIGURE 1. Assume further that a magnetizing force (power) is applied to the element for a time interval sufficient to drive the magnetism of the element to the point E. This operation would require a predetermined amount of energy, say $P_eT_e$.

To return the magnetic state to the saturation level D, requires an amount of energy designated $P_dT_d$, which substantially coincides to the energy $P_eT_e$. That is, ideally $P_eT_e = P_dT_d$.

In general, the present invention utilizes the above relationship of time and power in the conversion of analog amplitude-representative signals into time-modulated, or pulse-duration-modulated signals. This operation is performed by maintaining the interval $T_e$ constant and applying an analog signal (represented by $P_e$) to magnetize the element at some point removed from the saturation level to thereby register the analog signal. The element is then returned to the saturation level during a variable interval $T_d$ by a constant magnetizing force (power) $P_d$. Therefore, the variable time interval $T_d$ is proportional to the variable signal input $P_e$ and the conversion relationship is established.

Figure 2:
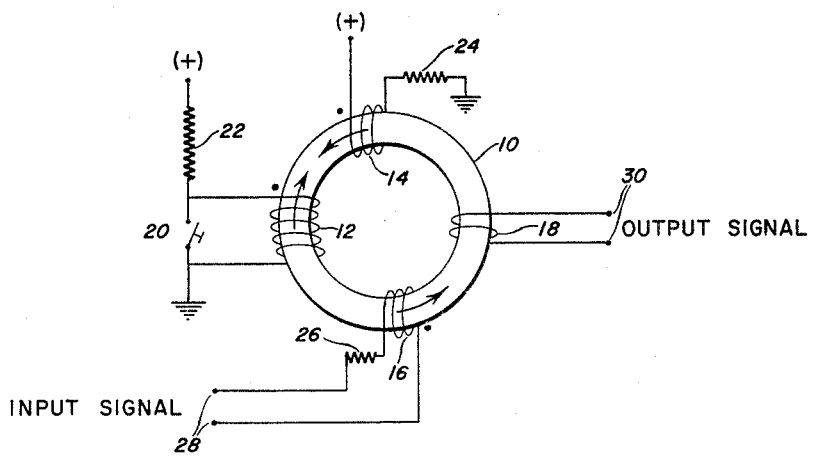
FIGURE 2 is a schematic diagram of a preliminary embodiment of the structure for the present invention.

In view of the above preliminary considerations, reference will now be had to FIGURE 2 which shows a preliminary structure for explanation of the invention. FIGURE 2 shows a magnetic core 10 in toroidal form which is made of material having a hysteresis characteristic as shown in FIGURE 1 with substantial residual magnetism. The core 10 may be made of different magnetic materials including ceramic ferrite, and bobbin-wound magnetic tape.

Windings 12, 14 and 16 are disposed upon the core 10 so as to magnetize or drive the core with the electromagnetism resulting from the current in each winding. The winding 12 is connected in parallel with a manually-operated normally-open switch 20. The winding 12 and the switch 20 are then connected in series with a current-limiting resistor 22 and the complete circuit is connected between a source of positive potential and ground. The winding 12 serves to create a magnetic field in the direction indicated by the arrow adjacent the winding 12.

The winding 14 is connected in series with a resistor 24 and the combination is connected between a source of positive potential and ground. The winding 14 serves to magnetize the core 10 in the direction indicated by the arrow adjacent the winding 14.

The winding 16 is serially connected with a resistor 26 across terminals 28 which are provided to receive an analog signal that is to undergo conversion. The energization of the winding 16 results in flux in the core as indicated by the arrow adjacent the winding 16, i.e. aiding the flux of the winding 14 and opposing the flux of the winding 12.

A winding 18 also mounted on the core 10 is connected across terminals 30 to provide the output signal from the converter which is induced in this winding upon the occurrence of flux changes in the core 10.

In operation, the windings 12, 14 and 16 are all energized during the quiescent interval to apply a composite magnetic driving force to the core 10. The driving force resulting from the winding 16 is proportional to the input analog signal. The driving force applied to the core 10 by the winding 14 is relatively constant and may be considered as a bias magnetizing force which aids the magnetizing force of the analog signal. The magnetizing force provided by the winding 12 is opposed to the other magnetizing forces, and is considerably stronger, so as to drive and hold the core 10 at a level of positive saturation although the other windings are energized. The saturation level of the core is a relatively stable state of magnetism and this persistent level of magnetism is substantially maintained as long as the force of the winding 12 is above some predetermined value.

Considering the operation of the structure of FIGURE 2 to accomplish a conversion, the switch 20 is closed after the core has been magnetized to positive saturation. Closure of the switch shunts the winding 12 so that no current flows through the winding 12 with the result that no magnetizing force is provided by the winding 12. The winding 14 then exerts a magnetizing force upon the core which (considered alone) drives the core substantially to the knee F (FIGURE 1). The magnetizing force provided by the winding 14 is aided by the magnetizing force of the winding 16, which is proportional to the analog signal. Therefore, the total magnetizing force applied drives the core from the persistent level of saturation downward at a rate dependent upon the amplitude of the analog signal undergoing conversion.

The interval during which the switch (FIGURE 2) is open is precisely timed and is inadequate to permit the magnetism of the core 10 to reach negative saturation even when the analog signal is at its highest value. That is, during normal operation, the switch 20 is opened prior to the time when the core reaches negative saturation. Opening the switch 20 results in the application of a strong, positive magnetizing force by the coil 12 to drive the core back to the positive saturation level. At the instant the switch 20 is opened, the flux in the core begins to change toward positive saturation, and the interval required for the core to attain saturation depends upon the length of the excursion away from the positive saturation. During the interval that the core is returned to positive saturation, the flux in the core is undergoing change and a voltage is induced in the winding 18 which appears across the output terminals 30. Therefore, at the instant the switch 20 is closed, a voltage appears at the output terminals 30 until the core reaches positive saturation. When the core again reaches positive saturation, the flux change in the core is very slight; therefore, no further significant voltage is induced in the winding 18 to be presented at the output terminals 30. Therefore, the interval of the voltage at the terminals 30 is proportional to the amplitude of the analog signal.

Thus, by providing a magnetizing force (representative of power) to the core 10 during a precise time interval, the signal represented by the magnetizing force is converted to a representative time interval by employing an unvarying magnetizing force to return the core to saturation.

In the apparatus of FIGURE 2, various conversion scales may be employed depending on the characteristics of the core 10, and the relative sizes of the windings 12, 14 and 16. Furthermore, the various functions of the individual windings may be combined to obtain desired magnetic effects and variable magnetizing forces may be employed to compensate certain affects. Examples of these systems are now considered.

Figure 3:
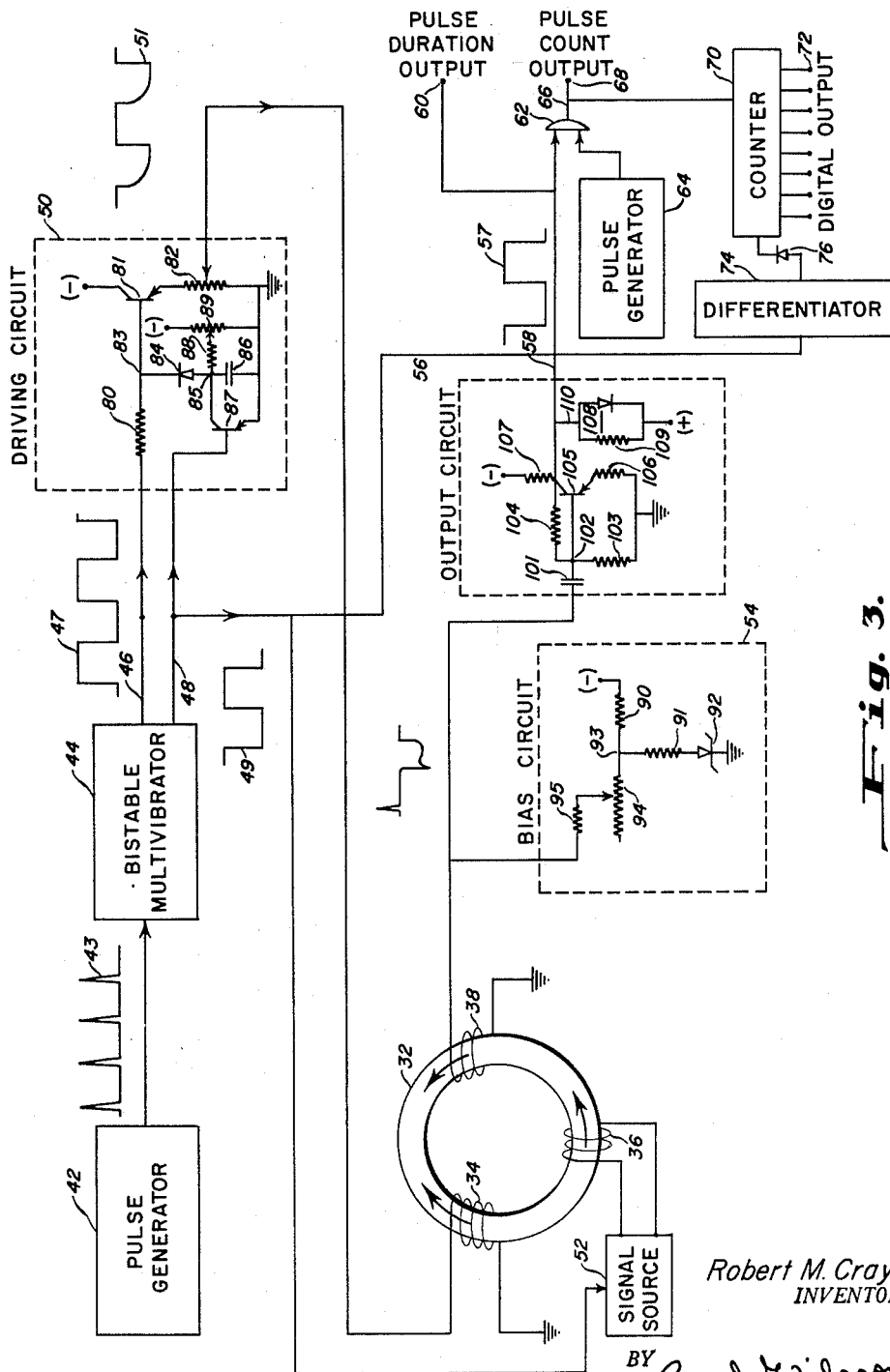
FIGURE 3 is a diagrammatic representation of another embodiment of the present invention.

Referring to FIGURE 3, there is shown a complete embodiment of the present invention. In FIGURE 3, a core 32 is provided with a saturating winding 34, an input winding 36 and a bias-output winding 38. The direction of the magnetizing force provided by each of these windings is indicated by the arrows adjacent the windings in accordance with the previously-adopted convention, that is, with the magnetism of the windings 36 and 38 opposed to that of the winding 34.

The basic operation of the core 32 is somewhat similar to that previously described. The winding 34 holds the core at the saturation level in the quiescent state. Then, during a conversion, the winding 34 is de-energized for a precisely-timed set interval to permit the windings 36 and 38 to alter the magnetization of the core 32 down the hysteresis loop by an amount proportional to the input signal. At the termination of the measured time interval, the winding 34 is again energized to provide a magnetizing force which is very high relative to the combined magnetizing forces from the windings 38 and 36. Thereupon, the magnetization of the core 34 ascends to the saturation level during a conversion interval which varies as the extent to which the windings 36 and 38 drove the core away from the saturation level. This time interval is manifest by a voltage induced in the winding 38, which essentially has a duration proportional to the input signal.

Considering the system of FIGURE 3 in greater detail, the operating cycle is controlled by a pulse generator 42, which provides regularly-occurring impulses 43, and may take the form of various well-known stable pulse-oscillator circuits. The pulses 43, from the pulse generator 42, are voltage spikes some 40 milliseconds apart in one successful embodiment of the invention, and are applied to a bistable multivibrator 44. The multivibrator 44 may take the form of various two-state circuits, and alters its state upon receiving each of the pulses 43. The multivibrator 44 has one output through a conductor 46, which carries a pulse train 47 and another output through a conductor 48, which carries a pulse train 49, inverted from the train 47. That is, the two-state signal in the conductor 48 is the complemented or inverted form of the two-state signal carried by the conductor 46.

The conductors 46 and 48 supply signals to a driving circuit 50 which develops negative-going pulses 51 having an exponential leading edge. The manner in which the negative-going pulses 51 are formed by the driving circuit 50 is considered below; however, it is to be noted that the pulses control the energization of the saturation winding 34, and thus control the intervals during which the core 32 is set and reset. That is, during the intervals between the pulses 51 no current flows through the winding 34 and the core 32 is set to a flux level proportional to the analog signal to be converted. This setting is affected by energization of an analog signal source 52 under the control of positive-going portions of the train 47. Then during the pulses 51, current flows through the winding 34 to reset the core 32 which induces the representative time-modulated pulse in the output winding 38.

Considering the signal source 52, this element may take a variety of forms; however, one exemplary form is a strain gauge which provides an analog signal upon being energized. Various strain gauges and other transducers may be operated at a higher level of energization, if operation occurs for only brief time intervals. Therefore, in the embodiment of the present invention shown in FIGURE 3, the signal source 52 is energized under control of the bistable multivibrator 44, by a peak voltage so that a high signal output is applied from the signal source 52 to the winding 36; however, the output is provided only during the interval when the core 32 is set.

A further consideration relative to the signal source 52 is the non-linear nature of the pulses 51. Transducer devices often provide a non-linear analog output. That is, the slope of a curve representing analog signal amplitude versus the intensity or degree of the phenomena sensed by the transducer, is non-linear. This characteristic of many transducers often results from inductive elements or other saturable affects. By providing the pulses 51 with a non-linear leading edge, non-linearities in the signal source 52 as well as the conversion system per se are compensated.

The output voltage from the core 32 is to the bias-output winding 38 which has one terminal connected to ground, and the other connected both to a bias circuit 54 and an ouput circuit 56. The function of the bias circuit 54 is to provide a relatively constant current through the winding 38 which assures that the flux in the core 32 will exceed the knee of the hysteresis loop during the setting intervals. The components of the bias circuit 54, along with the other circuits shown in detail are considered below.

The output circuit 56 receives the pulse voltage induced in the winding 32, amplified the voltage and forms a regular, rectangular pulse 57, which appears in the conductor 58. The conductor 58 is connected to an output terminal 60 providing time-modulated pulses representative of the analog signal.

The conductor 58 is also connected as an input to a coincidence gate 62 which receives another input from a pulse generator 64. The coincidence gate 62 may comprise any of a variety of well-known structures which function to receive a plurality of two-state input signals, and which provide the high state of a two-state output signal when all the input signals are in a high state.

The pulse generator 64 may take various well-known forms and provides impulses at a frequency much higher than the pulse generator 42. For example, the pulse generator 64 may provide impulses at a rate 100 times greater than the rate of the pulse generator 42.

The pulses from the pulse generator 64 are gated through the gate 62 during the interval of the time-modulated output. Therefore, the number of pulses appearing in the conductor 66 during a conversion interval is proportional to the amplitude of the original analog signal and is provided at an output terminal 68.

The output from the gate circuit 62 is also connected to a counter 70 which may comprise a well-known multistage binary counter. The pulses from the gate 62 are applied to the counter 70 so that each pulse advances the counter by one count. Therefore, during a conversion interval, the pulses from the gate 62 are accumulated in the counter 70 to present a true digital output in parallel form at the terminals 72.

Various arrangements may be made to clear the counter 70; however, one arrangement is shown, which includes a differentiator circuit 74 connected to receive the pulse train 47, and apply its output through a diode 76 to clear the counter 70 prior to a time-modulated output. Thus, the negative-going portions of the wave train 47 are formed into voltage spikes which pass through the diode 76 to reset the counter 70.

Considering the operation of the system during an exemplary conversion, assume initially that a conversion interval has been completed. The multivibrator 44 is therefore in a state to provide a low voltage in the conductor 46, and a high voltage in the conductor 48. The low voltage in the conductor 46 results in a pulse 51 from the driving circuit 50 to pass a current through the winding 34 adequate to maintain the core 32 at positive saturation (arbitrarily assigned).

At this time, a low voltage from the conductor 46 is also applied to the signal source 52, so that the signal source is de-energized during periods when not in use. Therefore, no current passes through the winding 36 and the core 32 experiences no magnetizing force from the winding 36.

During this interval, the winding 38 is energized by the bias circuit 54 to form a magnetizing force opposed to that of the winding 34. However, the magnetizing force of the winding 38 is insignificant relative to the force of the winding 34, therefore, the core is held at positive saturation.

With the system in this state, the next pulse from the pulse generator 43 causes the voltage in the conductor 46 to go high and the voltage in the conductor 48 to go low. The high state of the voltage in the conductor 46 causes a high state of the voltage from the driving circuit 50 (ground) to be applied to the winding 34. Therefore, the winding 34 is connected across ground and no current flows. Also, at the instant of transition, the high voltage in the conductor 46 is applied through the differentiator 74 and the diode 76 to reset the counter 70.

The high state of the voltage in the conductor 46 is also applied to the signal source 52, thereby producing an output from the source 52 to energize the winding 36 and provide a magnetizing force proportional to the analog signal from the signal source 52.

The core 32 now experiences magnetizing force from the windng 38 (to drive the core 32 to the knee of hysteresis loop) and from the winding 36 (proportional to the analog signal undergoing conversion). Therefore, the flux in the core 32 drops (as to point E in FIGURE 1) by an amount proportional to the analog signal. This drop does not accur instantaneously but occurs over the interval that no current flows through the winding 34.

Current through the winding 34 is re-established upon the occurrence of the next pulse from the pulse generator 42, causing the voltage in the conductor 46 to go low and the voltage in the conductor 48 to go high. The low state of the voltage in the conductor 46 results in an exponentially-increasing current through the winding 34 from the driver circuit 50. The current through the winding 34 produces a magnetic driving force to return the core 34 to positive magnetic saturation.

As the flux of the core 32 increases traversing the hysteresis loop from a point as E in FIGURE 1, back to positive saturation, a voltage is induced in the bias-output winding 38 which is applied to the output circuit 56 to be amplified, inverted, and formed into a well-defined pulse, the duration of which is indicative of the amplitude of the analog signal. This pulse is then employed to control the gate circuit 62 to provide a pulse count output proportional to the analog signal, which is in turn applied to the counter 70 to provide a true binary digital output.

At the time when the core 32 reaches saturation, no further significant voltage is induced in the winding 38. The output circuit discriminates against the small voltage which is induced after saturation, thereby defining the termination of the pulse which indicates the analog signal. However, the conversation interval for the system (as defined by the negative state of the voltage in conductor 46) persist until the occurrence of another set interval. Thus, the system proceeds to function during alternate set and conversion intervals, alternately setting the state of the core 32 away from the saturation level by an amount proportional to the analog signal, and then returning the magnetic state of the core 32 to saturation with a relatively-constant driving force to provide a time interval indicative of the analog signal.

In the embodiment of FIGURE 3, the driving circuit compensates for non-linearity of increasing sensitivity with analog signal increases. That is, if the analog signal is small, it is assumed to be more effective in setting the core 32 than a large signal. Therefore, an initially-small driving current of the driving circuit 50 balances this variation. Of course, the variation of the current through the winding 34 becomes immaterial after the core reaches saturation.

Considering the exemplary driver circuit 50 in greater detail, the circuit is controlled by the output from the multi-vibrator 44 to form negative-going exponential pulses 51 as shown. These pulses coincide in time with the low-states of the voltage in the conductor 46, and the operation of the driving circuit 50 to produce them will now be considered.

The voltage in the conductor 46 is applied through a resistor 80 to the base electrode of a transistor 81 having a collector electrode connected to a source of negative potential, and an emitter electrode connected through a tapped resistor 82 to ground. The junction point 83 between the resistor 80 and the transistor 81 is connected through a diode 84 to a junction point 85. The junction point 85 is connected through a capacitor 86 to ground, and to the collector electrode of a transistor 87, having a grounded emitter, and a base electrode connected to the conductor 48. The junction point 85 is also connected through a resistor 88 to a tapped resistor 89 connected between a source of negative potential and ground.

In the operation of the driving circuit 50, during the interval when the voltage in the conductor 46 is high and the voltage in the conductor 48 is low, the transistor 81 is maintained cut off while the transistor 87 conducts. With the transistor 87 conductive between emitter and collector electrodes, the capacitor 86 is discharged. As the transistor 81 is cut off, the voltage across the resistor 82 is at ground potential so that no current is drawn through the winding 34.

With the reversal in state of the multivibrator 44, the voltage in the conductor 46 goes low while the voltage in the conductor 48 goes high. The high voltage in the conductor 48 cuts off the transistor 87 so that the capacitor 86 is no longer shunted. The low state of the signal in the conductor 46 renders the transistor 81 conductive to develop a voltage across the resistor 82. However, after an initial surge, the conduction of the transistor 81 occurs exponentially with the charging of the capacitor 86. That is, as the voltage at the junction point 83 decreases, it may drop rapidly to the level of the junction point 85. Upon this initial drop, the transistor is rendered conductive to a limited extent. This current may be adjusted by varying the tapped resistor 89.

After the initial conduction of the transistor 81, the current through the transistor may gradually increase as the capacitor 86 is charged to alter the input to the transistor 81. When the capacitor 86 becomes fully charged, the voltage at the junction point 83 coincides to the voltage in the conductor 46 and the transistor 81 is fully conductive.

The driving circuit 50 reverses from the above described state upon the next change in state by the multivibrator wherein the transistor 81 is cut off and the transistor 87 is rendered conductive to rapidly discharge the capacitor 86.

Various values for the capacitor 86 and the other components in the driving circuit 50 may be employed to vary the linearity of the output from the driving circuit. Furthermore, various wave forms other than that shown may be employed. However, in any instance, the function of a varying output from the driving circuit 50 during the conversion interval serves to control the winding 34 so as to compensate undesired non-linearities and other side effects.

As considered above, the bias circuit 54 provides a current which assures that the total magnetizing force applied to the core during the "set" interval exceeds the knee of the hysteresis loop. In detail the exemplary bias circuit 34 contains a series circuit including a resistor 90, a resistor 91 and a Zener diode 92. This circuit is connected between a source of negative potential and ground. The junction point 93, between the resistors 90 and 91 is connected to a tapped resistor 94, the movable element of which is connected through a resistor 95 to the winding 38. In effect, the bias circuit 54 provides a relatively-constant current through the winding 38. In the operation of the circuit, the Zener diode 92 functions as a voltage regulator to control the current flow through the resistors 90, 94 and 95 and provide substantially-constant current through these elements and the winding 38.

The output circuit 56 in FIGURE 3 serves to provide a well-formed pulse from the voltage induced in the winding 38 and discriminates against voltages induced after the core reaches the saturation level. The negative-going voltage induced in the winding 38 is coupled into the output circuit 56 by a capacitor 101 which is connected to a junction point 102. The junction point 102 is connected through a resistor 103 to ground, through a resistor 104 to the collector electrode of a transistor 105, and directly to the base electrode of a transistor 105. The emitter electrode of the transistor 105 is connected through a resistor 106 to ground. The collector electrode of the transistor is connected through a resistor 107 to a source of negative potential, and through a parallel circuit including a resistor 109 and a diode 110 to ground. The output from the circuit 56 appears at the collector electrode of the transistor 105.

The input to the circuit 56 is amplified by the transistor 105 and linearized by employing feedback applied through the resistor 104. The output from the transistor 105 is clamped by the circuit 108, so that upon reaching a predetermined level, the output is stabilized.

The system of FIGURE 3 conversions are performed in sequence so that immediately after the core 32 is set, it is sensed to perform the desired conversion. In many instances, it is desirable to set a core or other magnetic element, then permit the core to hold the information until desired. A system for accomplishing this "set and hold" operation is shown in FIGURE 4 and will now be described in detail. The system is commanded to sample the signal source by application of a pulse at a "sample" terminal 202. Thereupon, a core 204 is set at a magnetic level removed from the saturation level to indicate the analog signal received from a source 206. The core 204 then holds or stores the analog signal until a "sense" signal is applied at a terminal 208 which commands the conversion operation to provide the time-modulated pulse at an output terminal 210.

Considering the system of FIGURE 4 in detail, the "sample" terminal 202 is connected to a monostable multivibrator 202 which is in turn connected to provide one input to a coincidence gate 214. The coincidence gate 214 receives another input from a pulse generator 216, and the output from the coincidence gate is applied to a bistable multivibrator 218. The output from the multivibrator 218 is therefore positive pulses of consistent time interval which are applied to the signal source 206 and through a driving circuit 220 and a diode 222 to the bias-output winding 224 on the core 208. The winding 224 is also connected to an output circuit 228 which is in turn connected as the input to a coincidence gate 230 that is also connected to receive a signal from a monostable multivibrator 232, that controls the saturation winding 234 on the core 204. The signal source 206 applies a proportionate driving force to the core 224 by passing a current through a winding 238. The output from the gate circuit is applied to a block of conversion circuits which may take the form of apparatus shown in FIGURE 3, including the pulse generator 64, the gate 62, and the counter 70.

In considering the operation of the system of FIGURE 4, reference will be had to FIGURE 5 which shows a hysteresis loop definitive of one material which may be employed in the core 204 having retentive magnetic characteristics. In the operation of the system of FIGURE 4, there are four separate states or intervals of operation. The first state may be considered a quiescent interval which occurs after the core has provided an output, and during which the core is at the saturation level W, indicated in FIGURE 5. At the conclusion of the quiescent state, the core is set (by being magnetized during a precisely-timed interval) to a level as at point X on the hysteresis curve of FIGURE 5. The magnetizing forces exerted upon the core 204 are then removed so that the core assumes a level of magnetization indicated at the point Y. This is a stable state of the core 204 and is indicative of analog signal received. At the time when the core is sensed, a magnetizing force is applied to drive the core back to the positive saturation, as indicated by point Z, thereby inducing voltage in the output winding, indicative of the analog signal.

In considering the system of FIGURE 5, assume initially that the core 204 is magnetized to the point W, that is at positive saturation, or the positive residual state. Upon application of a "sample" pulse to the terminal 202, the monostable multivibrator 212 forms a positive pulse having an interval greater than the space between two of the pulses from the generator 216, but less than the interval separating three such pulses. Therefore, in spite of minor variations in the period of the pulses from the monostable multivibrator 212, two pulses from the generator 216 are gated through the gate circuit 214 to the bistable multivibrator 218. The frequency of the pulse generator 216 is very stable; therefore, the spacing between the two pulses applied to the bistable multivibrator 218 is substantially constant, resulting in the generation of a precise-duration pulse from the multivibrator 218.

The pulse from the multivibrator 218 is applied to the signal source 206 and to the driving circuit 220. Application of pulse to the signal source 206 acts to energize the signal source (which may take the form of a transducer as a strain gauge) resulting in a current through the winding 238 indicative of the observed phenomena.

Simultaneously with the energization of the signal source 206, the driving circuit 220 provides a current through the winding 224 resulting in a magnetizing force which aids the magnetizing force provided from the winding 238. The magnetizing force provided by the winding 224 drives the core 204 substantially to the knee of the hysteresis curve. Therefore, the combined magnetizing forces from the windings 224 and 238 causes the magnetism of the core to traverse downward on the hysteresis loop, as to a point X indicated in FIGURE 5.

Prior to core reaching a state of negative saturation, the positive pulse from the multivibrator 218 terminates so that the driving circuit 220 and the signal source 206 are de-energized terminating the magnetic forces applied to the windings 224 and 238. Thus, the core 204 is magnetized at a level (indicated at Y in the FIGURE 5) that is indicative of the analog signal from the signal source 206. The core 204 may be left in a set state for a considerable interval of time and will continue to register or hold its magnetic state indicative of the analog signal.

When the contents of the core 204 are to be manifest, a "sense" signal is applied at the terminal 208 thereby causing the monostable multivibrator 232 to provide a pulse to the winding 234 and to the gate 230. The pulse applied to the winding 234 for an interval which is sufficient to return the core to positive saturation; however, this interval need not be precisely timed.

As the core is returned to positive saturation, a voltage is induced in the winding 224 which is shaped by the output circuit 228 and applied to the gate 230. The gate 230 is qualified during this interval by the pulse from the monostable multivibrator 232; therefore, a pulse-width modulated output appears at the terminal 210. This signal may be employed in the form in which is appears at the terminal 210 or alternatively may be operated upon by conversion circuits 252 as described with reference to FIGURE 3 to provide either a series of pulses or a true digital output.

From a consideration of the above, it is apparent that an important feature of the present invention resides in the use of a magnetic material which is initially magnetized to register an analog signal as a result of application of power indicative of the signal during a precise time interval. The magnetic material is then caused to manifest a pulse having a duration indicative of the analog signal by applying a relatively constant-power signal to return the magnetic material to saturation, and observing the interval of flux change.

Another important feature of the present invention resides in the consideration that an analog signal may be sampled, magnetically registered, and at a later time presented as a pulse-width modulated signal, a series of pulses, or a true digital representation.

Still another important feature of the present invention resides in the provision of a non-linear driving circuit to compensate for non-linear aspects of the system.

It should be noted that although the particular embodiments of the invention herein described is fully capable of providing the features and achieving the objects set forth, such embodiments are merely illustrative and this invention is not to be limited to the details of construction illustrated and described herein, except as defined by the appended claims.

What is claimed is:

1. A system for converting an amplitude-representative signal to a time-modulated pulse, comprising: a saturable element having substantial retentivity; means for placing said element in a saturated state; means for driving said element away from said saturated state to a degree proportionate to the amplitude of said signal, whereby said element registers the value of said signal for a variable time interval; and means operative at the termination of said time interval for sensing the period required to return said element to said saturated state in the form of an electrical pulse.

2. Apparatus according to claim 1 wherein said means for placing said element in a saturated state operates to exert a non-linear driving force on said element.

3. Apparatus according to claim 1 further including a source of electrical impulses and gating means controlled by said electrical pulse to pass said impulses during the interval of said pulse.

4. Apparatus according to claim 3 further including a digital counter connected to receive said impulses to indicate a digital value representative of said signal.

5. A system for providing pulse of variable duration to thereby represent a physical phenomena, comprising: a transducer operative during a first interval for sensing said phenomena to provide an analog signal having an amplitude to manifest said phenomena; a magnetic member having a saturable level of magnetism; means synchronized with said transducer to be operative during said first interval to apply a magnetizing force to said magnetic member which varies as said analog signal to thereby set said magnetic member with a magnetization removed from said saturable level to register said analog signal; means operative during a second interval, different from said first interval, to apply a magnetizing force to said magnetic member which magnetizes said member at said saturable level of magnetism; and means for sensing the period of said second interval required to magnetize said member at said saturable level of magnetism to manifest said analog signal.

6. A system for converting an amplitude-representative signal to a time-modulated pulse, comprising: a saturable magnetic element having retentive characteristics; non-linear means for magnetizing said element at saturation; means for magnetically driving said element away from saturation to a degree proportionate to the amplitude of said signal; and means for sensing the period of magnetic change in said element during return to saturation whereby to form a pulse duration representative of said signal.

7. A system for providing pulses of variable duration wherein the duration of said pulses represent data, comprising: an electrical transducer energizable to sense data and thereby form a representative level of signal amplitude; means for selectively energizing said electrical transducer during a predetermined first interval; a magnetic element having a substantially-rectangular hysteresis loop; first magnetizing means energizable to drive said magnetic element with a magnetizing force proportional to said signal amplitude; means for selectively energizing said first magnetizing means during said predetermined first interval; second magnetizing means for providing a magnetizing force to said element opposed to that of said first magnetizing means during a second interval and adequate to drive said magnetic element to saturation; and means for sensing the portion of said second interval required to establish said magnetic element at saturaion as manifest by an electrical pulse.

8. An electrical system for converting an amplitude-representative electrical signal to an equivalent pulse-duration signal, comprising: a magnetic element having a substantially-rectangular hysteresis loop; first magnetizing means energizable to drive said magnetic element with a magnetizing force proportional to said signal amplitude; means for selectively energizing said first magnetizing means during a first predetermined interval; second magnetizing means for providing a magnetizing force to said element opposed to that of said first magnetizing means during a second interval and adequate to drive said magnetic element to saturation; said magnetizing force of said second magnetizing means varying from low intensity to high intensity during said second interval; and means for sensing the portion of said second interval required to establish said magnetic element at saturation as manifest by an electrical pulse.

9. A system for providing pulses of variable duration wherein the duration of said pulses represent data, comprising: an electrical transducer energizable to sense data and thereby form a representative level of signal amplitude; means for selectively energizing said electrical transducer during a predetermined first interval; a magnetic element having a substantially-rectangular hysteresis loop; first magnetizing means energizable to drive said magnetic element with a magnetizing force proportional to said signal amplitude; means for selectively energizing said first magnetizing means during said predetermined first interval; second magnetizing means for providing a magnetizing force to said element opposed to that of said first magnetizing means during a second interval and adequate to drive said magnetic element to saturation; said magnetizing force of said second magnetizing means varying from low intensity to high intensity during said second interval; and means for sensing the portion of said second interval required to establish said magnetic element at saturation as manifest by an electrical pulse.

10. An electrical system for converting an amplitude-representative electrical signal to an equivalent pulse-duration signal, comprising: a magnetic element having a substantially-rectangular hysteresis loop; first magnetizing means energizable to drive said magnetic element with a magnetizing force proportional to said signal amplitude; means for selectively energizing said first magnetizing means during said predetermined first interval; second magnetizing means for providing a magnetizing force to said element opposed to that of said first magnetizing means during a second interval which is separated from said first interval by a variable time period, and which is adequate to drive said magnetic element to saturation; and means for sensing the portion of said second interval required to establish said magnetic element at saturation as manifest by an electrical pulse.

11. A system for providing pulses of variable duration wherein the duration of said pulses represent data, comprising: an electrical transducer energizable to sense data and thereby form a representative level of signal amplitude; means for selectively energizing said electrical transducer during a predetermined first interval; a magnetic element having a substantially-rectangular hysteresis loop; first magnetizing means energizable to drive said magnetic element with a magnetizing force proportional to said signal amplitude; means for selectively energizing said first magnetizing means during said predetermined first interval; second magnetizing means for providing a magnetizing force to said element opposed to that of said first magnetizing means during a second interval which is separated from said first interval by a variable time period, and which is adequate to drive said magnetic element to saturation; said magnetizing force of said second magnetizing means varying from low intensity to high intensity during said second interval; and means for sensing the portion of said second interval required to establish said magnetic element at saturation as manifest by an electrical pulse.

References Cited by the Examiner
UNITED STATES PATENTS

| | | | |
|---|---|---|---|
| 2,780,782 | 2/57 | Bright | 332—12 |
| 2,875,412 | 2/59 | Kaplan | 332—12 |

MALCOLM A. MORRISON, *Primary Examiner.*

IRVING L. SRAGOW, *Examiner.*